United States Patent
Muratsu et al.

(10) Patent No.: US 11,600,878 B2
(45) Date of Patent: Mar. 7, 2023

(54) BATTERY BLOCK AND BATTERY MODULE PROVIDED WITH SAME

(71) Applicant: Panasonic Intellectual Property Management Co., Ltd., Osaka (JP)

(72) Inventors: Jiro Muratsu, Osaka (JP); Shinya Geshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 252 days.

(21) Appl. No.: 16/638,899

(22) PCT Filed: Aug. 21, 2018

(86) PCT No.: PCT/JP2018/030773
§ 371 (c)(1),
(2) Date: Feb. 13, 2020

(87) PCT Pub. No.: WO2019/044582
PCT Pub. Date: Mar. 7, 2019

(65) Prior Publication Data
US 2020/0227698 A1 Jul. 16, 2020

(30) Foreign Application Priority Data
Aug. 31, 2017 (JP) .............................. JP2017-166335

(51) Int. Cl.
*H01M 50/20* (2021.01)
*H01M 50/502* (2021.01)
(Continued)

(52) U.S. Cl.
CPC ........... *H01M 50/20* (2021.01); *H01M 50/30* (2021.01); *H01M 50/502* (2021.01); *H01M 50/572* (2021.01); *H01M 2200/103* (2013.01)

(58) Field of Classification Search
CPC ........... H01M 50/502; H01M 10/0422; H01M 10/123; H01M 50/507; H01M 2200/103;
(Continued)

(56) References Cited

U.S. PATENT DOCUMENTS

2014/0255748 A1 9/2014 Jan et al.
2015/0380700 A1 12/2015 Hasegawa et al.
(Continued)

FOREIGN PATENT DOCUMENTS

CN 104995762 A 10/2015
CN 205863251 U 1/2017
(Continued)

OTHER PUBLICATIONS

International Search Report of PCT application No. PCT/JP2018/030773 dated Nov. 13, 2018.
(Continued)

*Primary Examiner* — Allison Bourke
*Assistant Examiner* — Jason Barton
(74) *Attorney, Agent, or Firm* — McDermott Will & Emery LLP

(57) ABSTRACT

A battery block includes assembled batteries that are arranged in parallel to each other, and the plurality of assembled batteries are each formed of a plurality of batteries as a unit. Each of the batteries has a positive-electrode terminal and a negative-electrode terminal on one end portion of the battery. The assembled battery includes: the plurality of batteries which are arranged in a row with one end portions of the batteries directed in the same direction; an insulation holder which is arranged on one end portion side of the batteries and holds the batteries; and a positive-electrode bus bar and a negative-electrode bus bar arranged on one end portions of the batteries. The positive-electrode bus bar and the negative-electrode bus bar are respectively (Continued)

held by holding portions which are formed on the insulation holder along a row direction and in parallel to each other.

11 Claims, 9 Drawing Sheets

(51) Int. Cl.
*H01M 50/30* (2021.01)
*H01M 50/572* (2021.01)

(58) Field of Classification Search
CPC .... H01M 50/583; H01M 10/04; H01M 50/20; H01M 50/204; Y02E 60/10; Y02P 70/50; Y10T 29/49108
See application file for complete search history.

(56) References Cited

U.S. PATENT DOCUMENTS

| | | | |
|---|---|---|---|
| 2016/0315304 A1 | 10/2016 | Biskup | |
| 2017/0018750 A1 | 1/2017 | Wintner | |

FOREIGN PATENT DOCUMENTS

| | | | | |
|---|---|---|---|---|
| JP | 2016-516273 | | 6/2016 | |
| WO | 2014/125806 | | 8/2014 | |
| WO | WO-2017062886 A1 | * | 4/2017 | .......... H01M 50/502 |

OTHER PUBLICATIONS

English Translation of Chinese Office Action dated Jan. 17, 2022 for the related Chinese Patent Application No. 201880052373.X.

* cited by examiner

BATTERY BLOCK AND BATTERY MODULE PROVIDED WITH SAME

TECHNICAL FIELD

The present invention relates to a battery block where an assembled battery formed of a plurality of batteries is set as a unit, and a plurality of the assembled batteries are arranged in parallel to each other.

BACKGROUND ART

There has been known a battery module where a battery block is formed by connecting a plurality of batteries parallel to each other, and a plurality of the battery blocks are connected to each other in series, thus enabling the battery module to output a predetermined voltage and a predetermined capacity.

PTL 1 discloses a battery block where a positive-electrode terminal and a negative-electrode terminal are mounted on one end portion of a battery, positive-electrode terminals and negative-electrode terminals of a plurality of batteries are connected in parallel to each other to positive-electrode bus bars and negative-electrode bus bars arranged on one end portions of the batteries. In this configuration, the positive-electrode bus bar and the negative-electrode bus bar are stacked on each other with an insulation plate interposed therebetween, holes are respectively formed in the bus bars and the insulation plate, and the positive-electrode terminal or the negative-electrode terminal of the battery is connected to the upper-layer bus bar via wires which pass through the holes.

CITATION LIST

Patent Literature

PTL 1: Unexamined Japanese Patent Publication No. 2016-516273

SUMMARY OF THE INVENTION

However, in the battery block disclosed in PTL 1, the positive-electrode bus bars and the negative-electrode bus bars are stacked on each other with the insulation plate interposed therebetween, and therefore it is necessary to form the holes in the bus bars and the insulation plate respectively for allowing wires to pass through the holes, corresponding to positions of the batteries. Accordingly, when an arrangement of the batteries is changed in the battery block, it is necessary to form holes corresponding to the change of the arrangement. Accordingly, there is a drawback that, to make the battery block compatible with various battery arrangements, a manufacturing cost is increased.

Further, in a case where a battery block is formed by arranging a plurality of batteries in an array, positive-electrode bus bars and negative-electrode bus bars stacked on each other with an insulation plate interposed therebetween are respectively formed of a flat plate which covers all batteries. Accordingly, the area is increased, thus giving rise to a drawback that a material cost is increased.

The present invention has been made in view of the above-mentioned drawbacks, and it is a main object of the present invention to provide a battery block formed of a plurality of batteries which are connected parallel to each other, and can reduce a manufacturing cost and a material cost.

A battery block according to the present invention includes a plurality of assembled batteries that are arranged in parallel to each other, the plurality of assembled batteries being each formed of a plurality of batteries as a unit. Each of the plurality of batteries has a positive-electrode terminal and a negative-electrode terminal which are electrically insulated from each other on one end portion of the battery. Each of the plurality of assembled batteries includes: the plurality of batteries which are arranged in a row in a state where the one end portion of each of the plurality of batteries is directed in a same direction; an insulation holder which is disposed on a side of the one end portion of each of the plurality of batteries and holds the plurality of batteries; and a positive-electrode bus bar which is disposed on the one end portion of each of the plurality of batteries and connects the positive-electrode terminals of the plurality of batteries to each other in parallel, and a negative-electrode bus bar which is disposed on the one end portion of each of the plurality of batteries and connects the negative-electrode terminals of the plurality of batteries to each other in parallel. The positive-electrode bus bar and the negative-electrode bus bar are respectively held by holding portions which are formed on the insulation holders in parallel to each other along a row direction.

According to the present invention, it is possible to provide a battery block where a plurality of batteries are connected in parallel to each other, which can reduce a manufacturing cost and a material cost.

DESCRIPTION OF EMBODIMENT

Hereinafter, exemplary embodiments of the present invention will be described in detail with reference to the drawings. The present invention is not limited to the following embodiments. Further, modifications of the present invention are appropriately conceivable without departing from the scope of the effect of the present invention.

Figure 1:
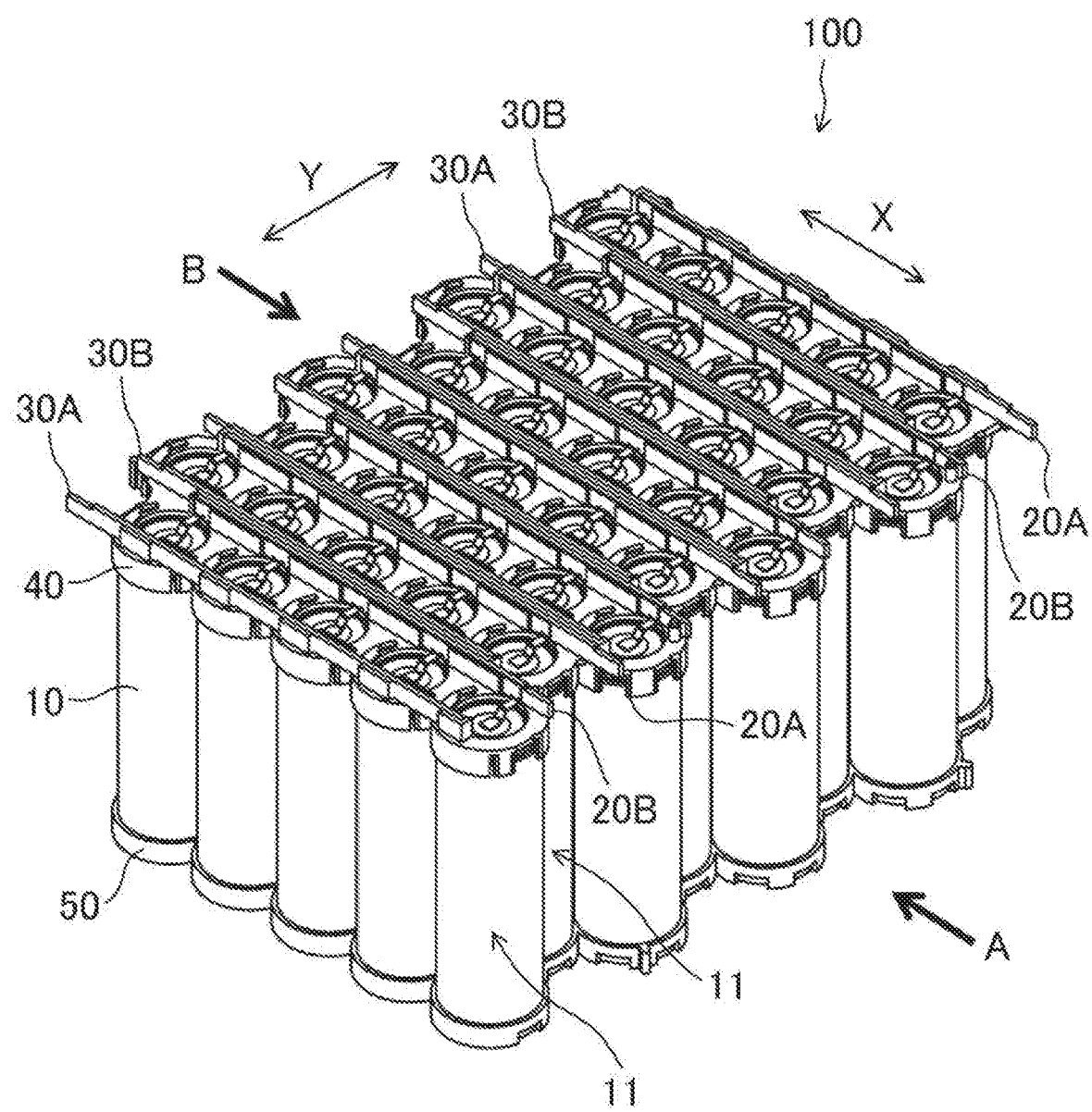
FIG. 1 is a perspective view schematically showing the configuration of a battery block according to an exemplary embodiment of the present invention.
Figure 2:
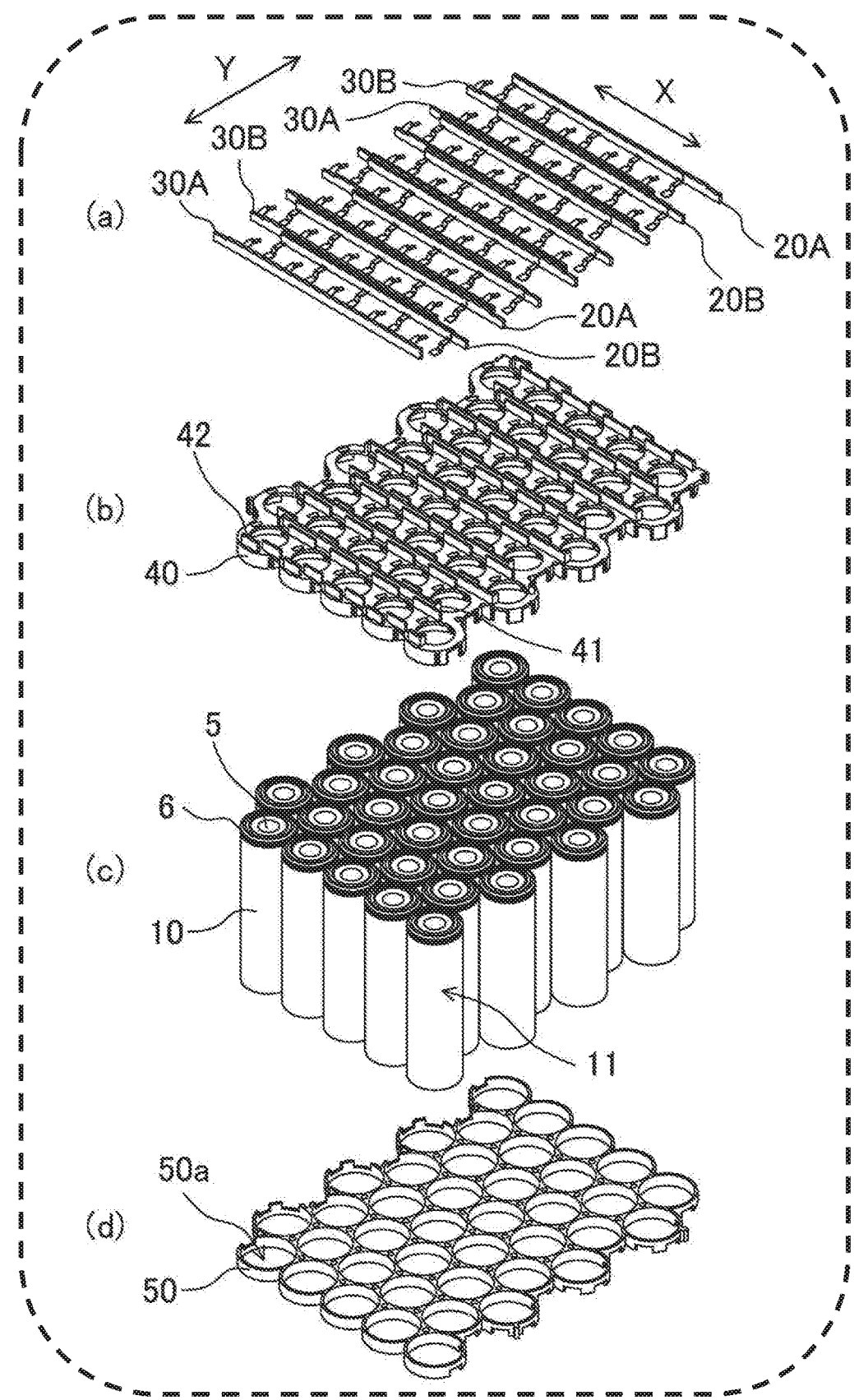
FIG. 2 is exploded views of the battery block according to the exemplary embodiment.

FIG. 1 is a perspective view schematically showing the configuration of battery block 100 according to an exemplary embodiment of the present invention. FIG. 2 is an exploded view of battery block 100 according to the exemplary embodiment.

As shown in FIG. 1 and FIG. 2, battery block 100 according to the exemplary embodiment is configured such that assembled battery 11 which is formed of a plurality of batteries 10 is set as a unit, and a plurality of assembled batteries 11 are arranged in parallel to each other. In the exemplary embodiment, the configuration is exemplified where assembled battery 11 is formed by arranging five batteries 10 in a row in an X direction, and battery block 100 is formed by arranging eight assembled batteries 11 in parallel to each other in a Y direction. However, the present invention is not limited to such a configuration.

As shown in FIG. 2(c), each of batteries 10 which form assembled battery 11 has positive-electrode terminal 5 at one end portion of battery 10 and negative-electrode terminal 6. Positive-electrode terminal 5 and negative-electrode terminal 6 are electrically insulated from each other at one end portion of the battery 10. Assembled battery 11 is formed such that the plurality of batteries 10 are arranged in a row in the X direction such that one end portions of batteries 10 are directed in the same direction.

Assembled battery 11 includes an insulation holder 40 which is disposed on one end portion side of batteries 10 and holds batteries 10. Further, as shown in FIG. 2(b), in insulation holder 40, holding portions 41, 42 which are formed parallel to each other along a row direction (X direction) are formed. In the exemplary embodiment, insulation holders 40 each of which is disposed for each assembled battery 11 are integrally formed when battery block 100 is viewed as a whole. However, insulation holders 40 may be formed in a separated manner for each assembled battery 11.

As shown in FIG. 2(a), assembled battery 11 includes positive-electrode bus bars 20B (20A) each of which connects positive-electrode terminals 5 of the plurality of batteries 10 to each other in parallel, and negative-electrode bus bars 30A (30B) each of which connects negative-electrode terminals 6 of the plurality of batteries 10 in parallel on one end portions of batteries 10. Although the detailed configuration is described later, the positive-electrode bus bars 20B (20B) and the negative-electrode bus bars 30A (30B) are respectively held on holding portions 41, 42 formed on insulation holder 40, respectively. With such a configuration, positive-electrode bus bars 20B (20A) and negative-electrode bus bars 30A (30B) are arranged in parallel to each other along the row direction (X direction) on both sides of batteries 10.

In the exemplary embodiment, with respect to assembled batteries 11 disposed adjacently to each other, the plurality of batteries 10 which form assembled battery 11 are disposed in a staggered (=zigzag) manner. Accordingly, with respect to assembled batteries 11 disposed adjacently to each other, lengths of positive-electrode bus bar 20B and negative-electrode bus bar 30A used in one assembled battery 11 and lengths of positive-electrode bus bar 20A and negative-electrode bus bar 30B used in the other assembled battery 11 are made respectively different from each other.

Further, cell holder 50 is disposed on an end portions of batteries 10 on a side opposite to one end portions of batteries 10. Respective batteries 10 are held by cell holder 50 by inserting respective batteries 10 in holes 50a formed in cell holder 50. It is preferable that cell holder 50 be integrally formed when battery block 100 is viewed as a whole.

Figure 3:
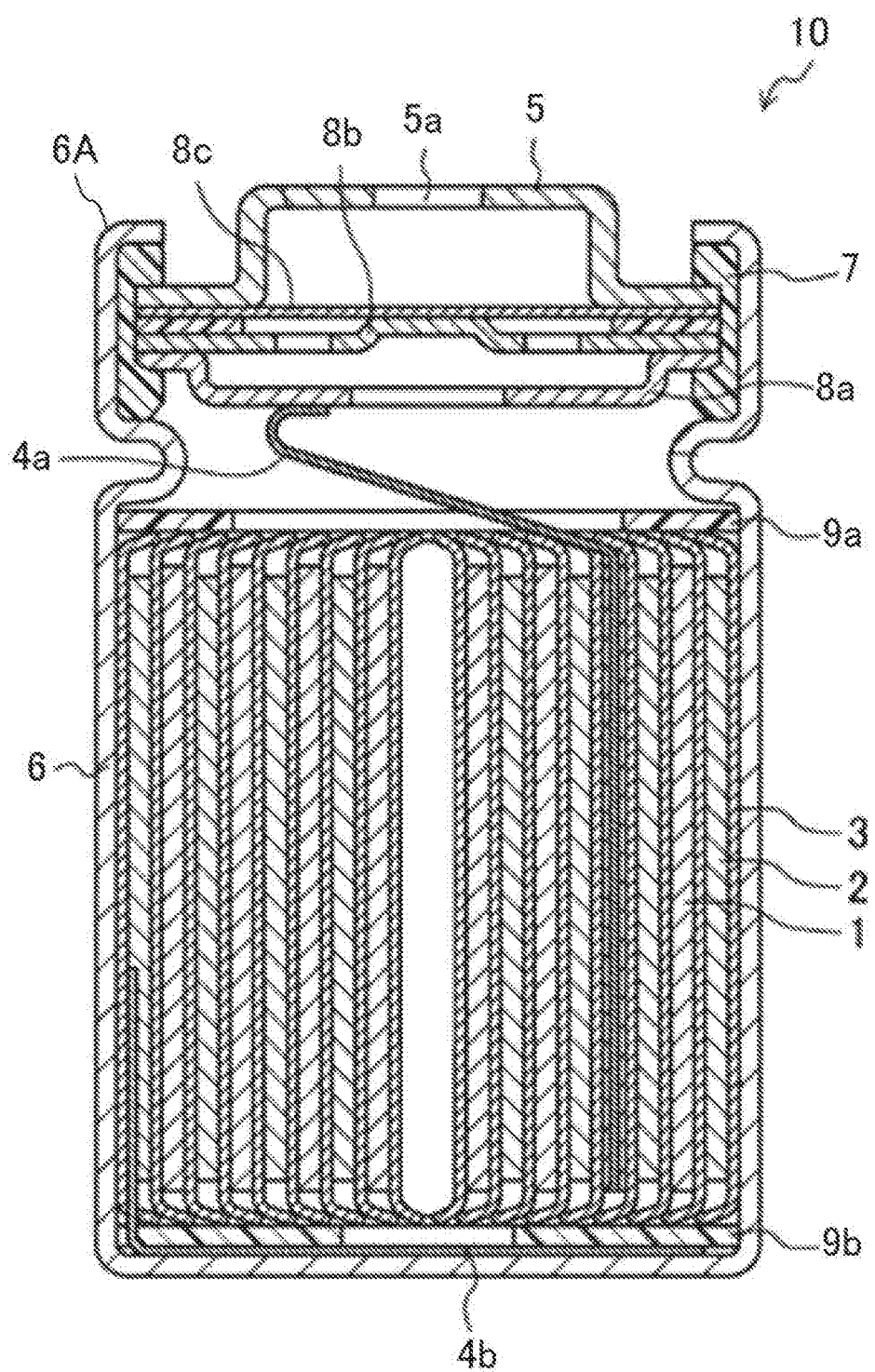
FIG. 3 is a cross-sectional view showing one example of a battery which forms an assembled battery.

Each of batteries 10 which form assembled battery 11 may be, for example, a lithium ion secondary battery having a cylindrical shape as shown in FIG. 3.

As shown in FIG. 3, battery 10 is formed such that an electrode assembly formed by winding positive electrode 1 and negative electrode 2 with separator 3 interposed between positive electrode 1 and negative electrode 2 is housed in battery case 6 together with a non-aqueous electrolyte (not shown in the drawing). Insulation plates 9a, 9b are disposed on upper and lower sides of the electrode assembly respectively, positive electrode 1 is bonded to filter 8a by way of positive electrode lead 4a, and negative electrode 2 is bonded to a bottom portion of battery case 6 which also functions as a negative-electrode terminal by way of negative electrode lead 4b.

Filter 8a is connected to inner cap 8b, and a protruding portion of inner cap 8b is bonded to metal-made valve element 8c. Valve element 8c is connected to sealing plate 5 which also functions as the positive-electrode terminal. Sealing plate 5, valve element 8c, inner cap 8b, and filter 8a form an integral body and seal an open portion of battery case 6 by way of gasket 7. An open portion 5a for discharging a gas generated in battery 10 to the outside is formed in sealing plate 5.

Figure 4A:
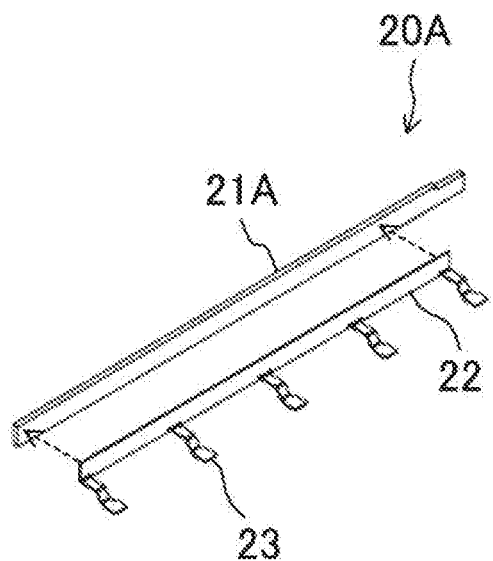
FIG. 4A and FIG. 4B are views schematically showing the configuration of positive-electrode bus bars according to the exemplary embodiment.
Figure 4B:
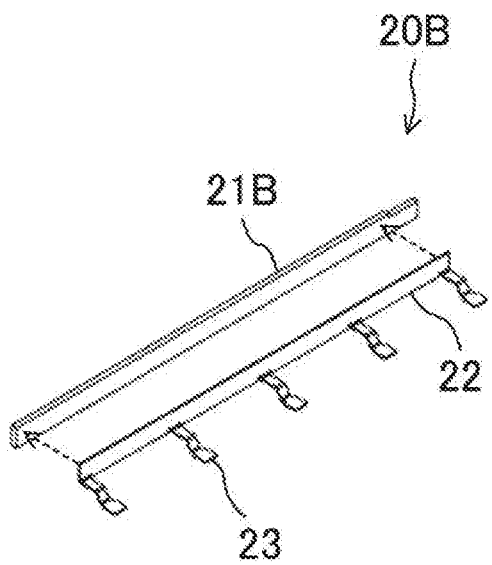

FIG. 4A and FIG. 4B are views schematically showing the configuration of the positive-electrode bus bars according to the exemplary embodiment, in which FIG. 4A shows the configuration of longer positive-electrode bus bar 20A, and FIG. 4B shows the configuration of shorter positive-electrode bus bar 20B.

Positive-electrode bus bar 20A is formed of bus bar main body 21A, and positive-electrode current collecting plate 22 having a plurality of (five in this exemplary embodiment) positive-electrode connecting pieces 23 connected to the positive-electrode terminals of the respective batteries. Bus bar main body 21A and positive-electrode current collecting plate 22 are bonded to each other by ultrasonic welding or the like. In the same manner as positive-electrode bus bar 20A, positive-electrode bus bar 20B is formed of bus bar main body 21B, and positive-electrode current collecting plate 22 having a plurality of positive-electrode connecting pieces 23 connected to the positive-electrode terminals of the respective batteries. Bus bar main body 21B and positive-electrode current collecting plate 22 are bonded to each other by ultrasonic welding or the like. In such a configuration, bus bar main body 21A is longer than bus bar main body 21B. However, positive-electrode current collecting plates 22 have the same configuration.

Figure 5A:
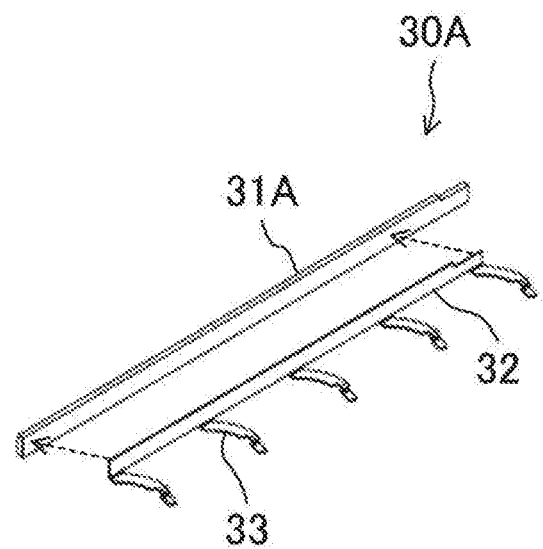
FIG. 5A and FIG. 5B are views schematically showing the configuration of negative-electrode bus bars according to the exemplary embodiment.
Figure 5B:
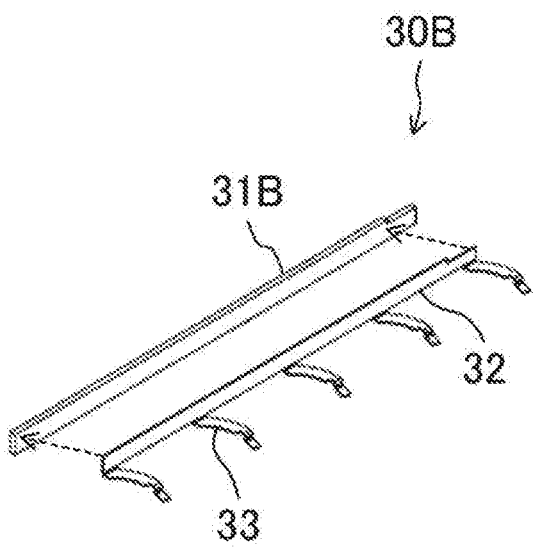

FIG. 5A and FIG. 5B are views schematically showing the configuration of the negative-electrode bus bars according to the exemplary embodiment, in which FIG. 5A shows the configuration of longer negative-electrode bus bar 30A, and FIG. 5B, shows the configuration of shorter negative-electrode bus bar 30B.

In the same manner as the positive-electrode bus bars, negative-electrode bus bar 30A is formed of bus bar main body 31A, and negative-electrode current collecting plate 32 having a plurality of negative-electrode connecting pieces 33 connected to the negative-electrode terminals of the respective batteries. Bus bar main body 31A and negative-electrode current collecting plate 32 are bonded to each other by ultrasonic welding or the like. In the same manner as negative-electrode bus bar 30A, negative-electrode bus bar 30B is formed of bus bar main body 31B, and negative-electrode current collecting plate 32 having a plurality of negative-electrode connecting pieces 33 connected to the negative-electrode terminals of the respective batteries. Bus bar main body 31B and negative-electrode current collecting plate 32 are bonded to each other by ultrasonic welding or the like. In such a configuration, bus bar main body 31A is longer than bus bar main body 31B. However, negative-electrode current collecting plates 32 have the same configuration.

In the exemplary embodiment, bus bar main bodies (21A, 21B), (31A, 31B) respectively have a thickness and a width corresponding to a current capacity when the plurality of batteries 10 which form assembled battery 11 are connected in parallel. On the other hand, positive-electrode current collecting plate 22 and positive-electrode connecting pieces 23 are integrally formed, and negative-electrode current collecting plate 32 and negative-electrode connecting pieces 33 are formed as an integral body. Positive-electrode connecting pieces 23 and negative-electrode connecting pieces 33 have a thickness which allows these pieces 23, 33 to have flexibility so as to be easily connected to positive-electrode terminals 5 and negative-electrode terminals 6 of batteries 10. Although materials for forming bus bar main bodies (21A, 21B), (31A, 31B) and positive-electrode current collecting plate 22 (positive-electrode connecting pieces 23), and negative-electrode current collecting plate 32 (negative-electrode connecting pieces 33) are not particularly limited, for example, aluminum or the like can be used.

Figure 6A:
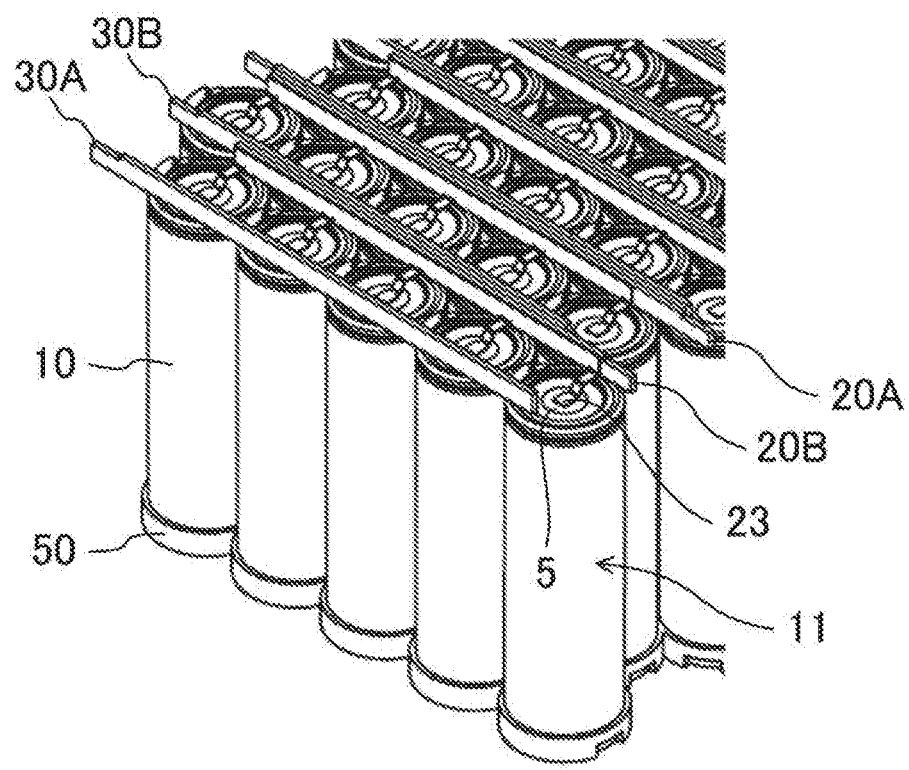
FIG. 6A and FIG. 6B are partially enlarged views showing a state where positive-electrode connecting pieces of the positive-electrode bus bar and negative-electrode connecting pieces of the negative-electrode bus bar are connected to positive-electrode terminals and negative-electrode terminals of the batteries, respectively.
Figure 6B:
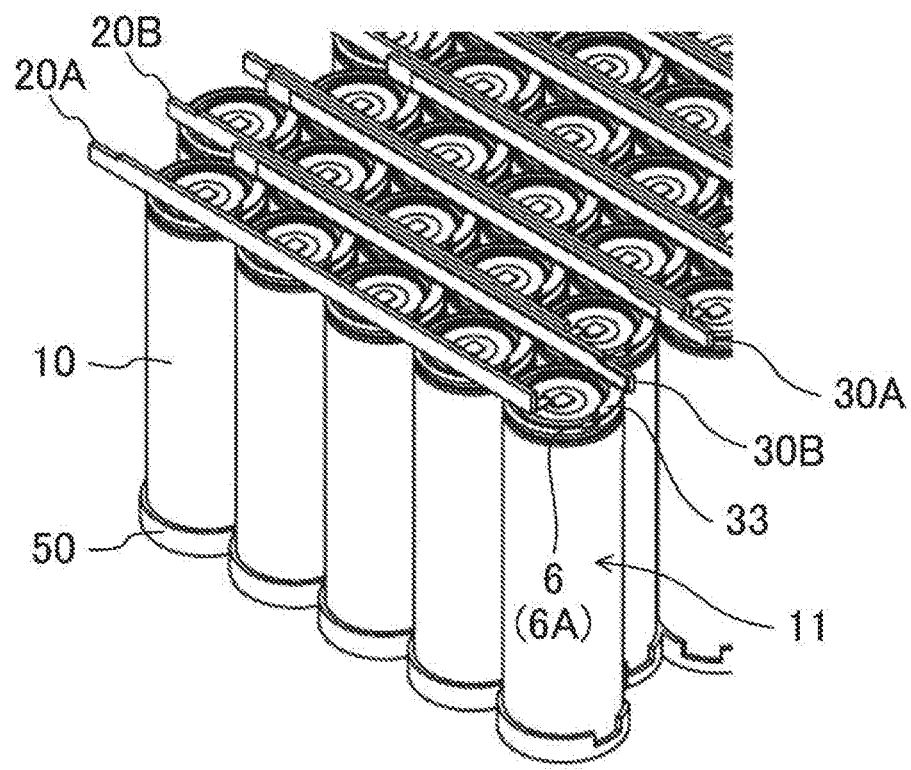

FIG. 6A and FIG. 6B are partially enlarged views showing a state where, in assembled battery 11 disposed at an end of the battery block, positive-electrode connecting pieces 23 of positive-electrode bus bar 20B are connected to positive-electrode terminals 5 and negative-electrode connecting pieces 33 of negative-electrode bus bar 30B are connected to negative-electrode terminals 6 of batteries 10. FIG. 6A is a perspective view showing the configuration as viewed in a direction indicated by an arrow A in FIG. 1, and FIG. 6B is a perspective view showing the configuration as viewed in a direction indicated by an arrow B in FIG. 1. In this specification, illustration of insulation holder 40 is omitted.

As shown in FIG. 6A, positive-electrode connecting pieces 23 of positive-electrode bus bar 20B are bonded to positive-electrode terminals 5 of batteries 10 by laser welding or the like, for example. As shown in FIG. 6B, negative-electrode connecting pieces 33 of negative-electrode bus bar 30B are bonded to negative-electrode terminals 6 of batteries 10 by laser welding or the like, for example. In this specification, although negative-electrode connecting piece 33 is bonded to shoulder portion 6A of battery case 6 as shown in FIG. 3, negative-electrode connecting piece 33 may be bonded to a side wall of battery case 6.

Figure 7:
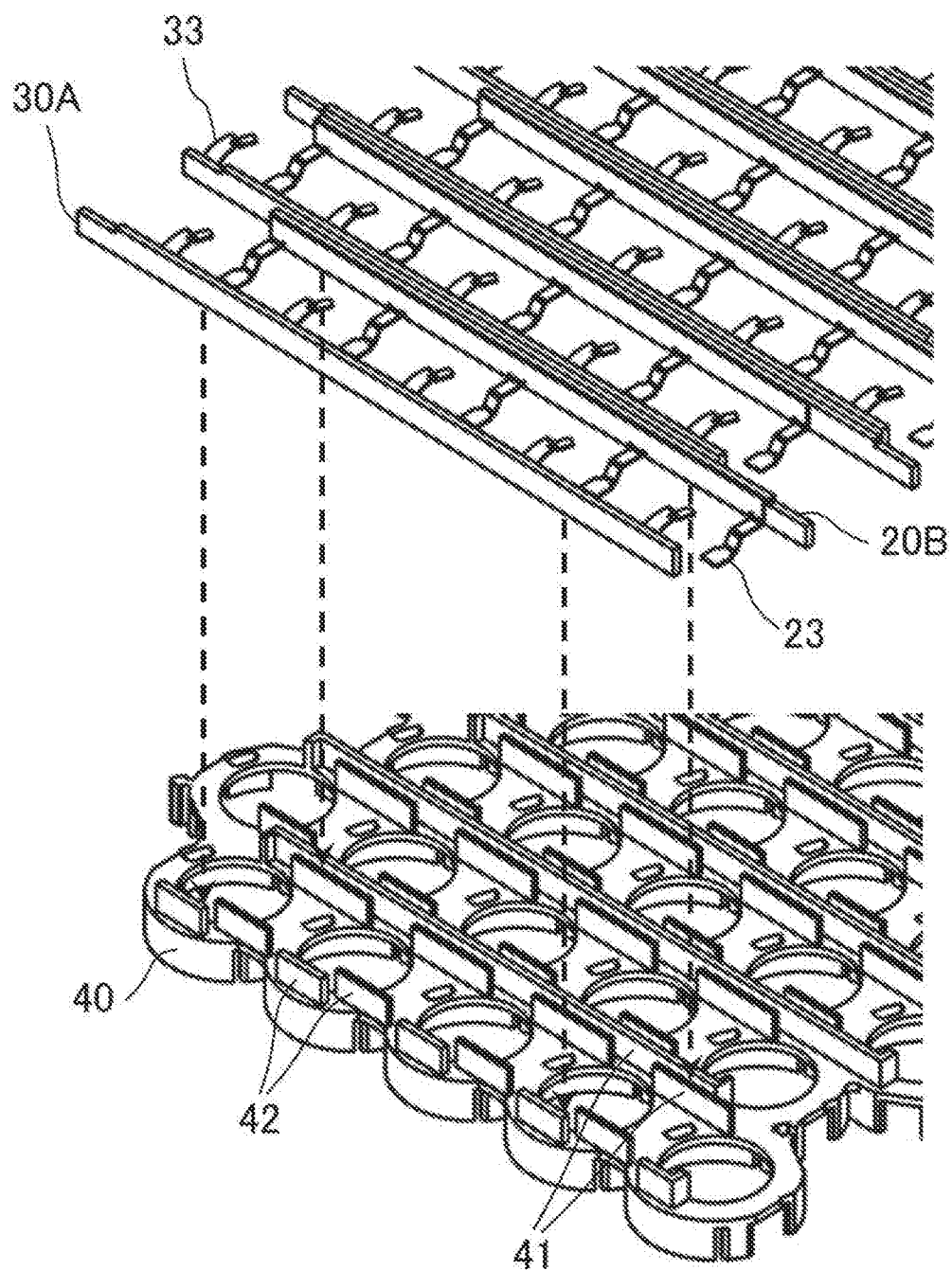
FIG. 7 is a view showing a method of holding the positive-electrode bus bars and the negative-electrode bus bars on holding portions formed on an insulation holder, respectively.

FIG. 7 is a view showing a method of holding positive-electrode bus bar 20B and negative-electrode bus bar 30A on holding portions 41, 42 formed on insulation holder 40 respectively in assembled battery 11 disposed at an end of the battery block.

As shown in FIG. 7, holding portion 41 which holds positive-electrode bus bar 20B, and holding portion 42 which holds negative-electrode bus bar 30A are formed parallel to each other along a row direction of batteries 10 which form assembled battery 11. In the exemplary embodiment, holding portions 41, 42 are each formed of ribs which are arranged alternately, and positive-electrode bus bar 20B and negative-electrode bus bar 30A are each held by being inserted into a gap formed between the ribs.

In assembled batteries 11 disposed adjacently to each other, the positive-electrode bus bar of one assembled battery 11 and the negative-electrode bus bar of the other assembled battery 11 opposedly face each other. However, insulation holding portion 41, 42 is interposed between the positive-electrode bus bar and the negative-electrode bus bar and hence, there is no possibility that the positive-electrode bus bar and the negative-electrode bus bar are brought into contact with each other. With such a configuration, it is possible to prevent the occurrence of a phenomenon that assembled batteries 11 disposed adjacently to each other are short-circuited.

In the exemplary embodiment, although shapes of holding portions 41, 42 are not particularly limited, as described above, to prevent the occurrence of a phenomenon that assembled batteries 11 disposed adjacently to each other are short-circuited, it is preferable that holding portion 41, 42 have at least a portion positioned outside the positive-electrode bus bar or the negative-electrode bus bar in a state where holding portion 41, 42 holds the positive-electrode bus bar or the negative-electrode bus bar.

In the exemplary embodiment, holding portion 41, 42 is formed of the ribs arranged alternately. However, for example, holding portion 41, 42 may be formed of ribs extending parallel to each other with a fixed gap therebetween. Insulation holder 40 and holding portion 41, 42 may be integrally formed using separate members.

Figure 8:
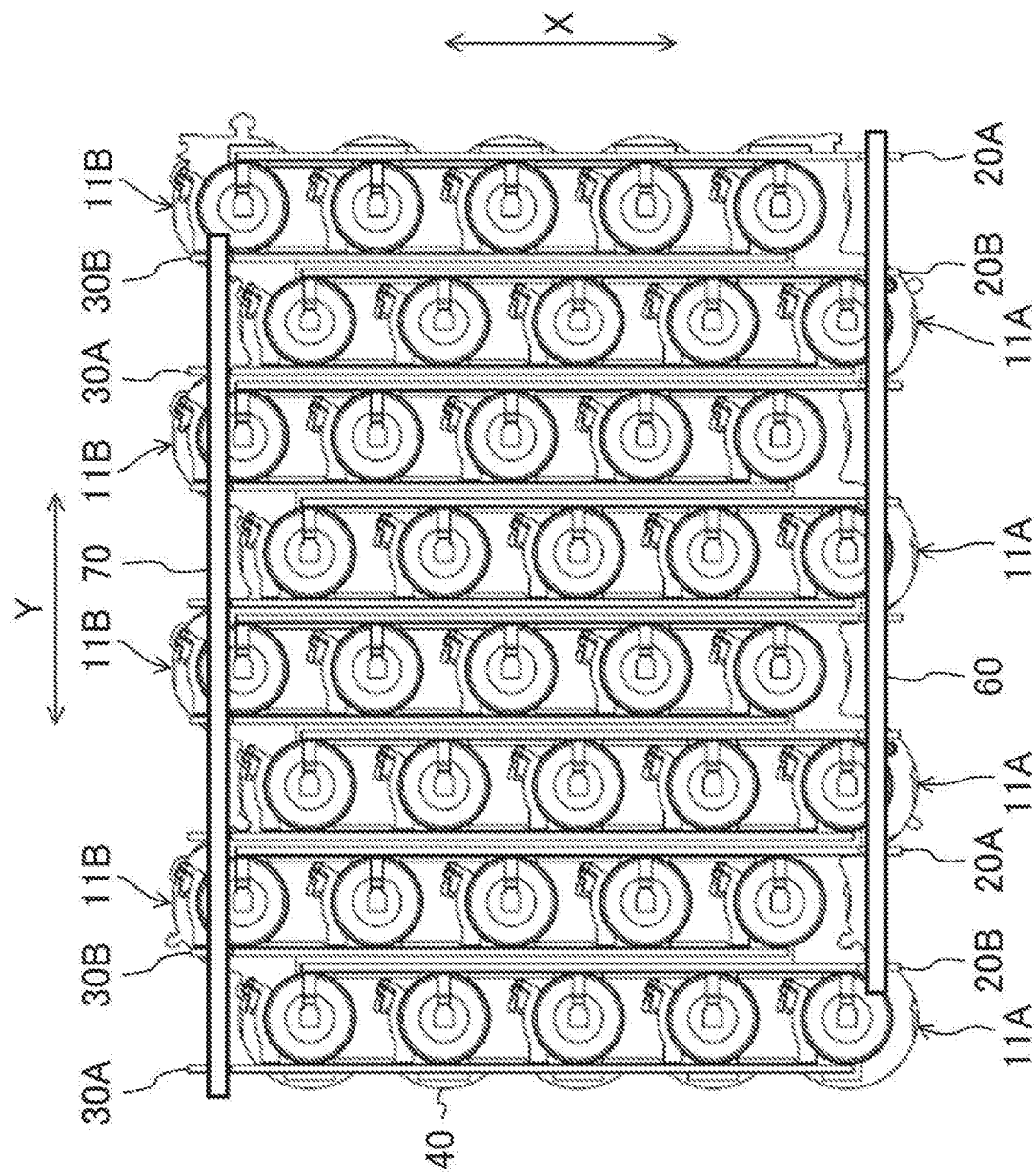
FIG. 8 is a plan view showing a method of connecting the respective assembled batteries parallel to each other in the battery block where the assembled batteries each of which is formed by arranging the plurality of batteries are arranged in parallel to each other.

FIG. 8 is a plan view showing a method of connecting respective assembled batteries 11 in parallel by taking a battery block where five batteries 10 are arranged in a row in the X direction thus forming assembled battery 11, and eight assembled batteries 11 are arranged in parallel to each other in a Y direction as an example.

In the exemplary embodiment, batteries 10 which form assembled battery 11 are connected in parallel by positive-electrode bus bar 20A (20B) and negative-electrode bus bar 30A (30B) which are provided independently for respective assembled batteries 11. Accordingly, for connecting all batteries 10 which form the battery block in parallel, it is necessary to connect assembled batteries 11 in parallel.

As shown in FIG. 8, in assembled batteries 11A, 11B disposed adjacently to each other, the plurality of batteries 10 which form respective assembled batteries 11A, 11B are disposed in a staggered manner. Accordingly, in the arrangement direction (X direction) of the plurality of batteries 10 which form assembled battery 11, assembled batteries 11A, 11B disposed adjacently to each other protrude in opposite directions respectively.

Accordingly, positive-electrode bus bars 20A, 20B in respective assembled batteries 11A are extended to one end portion in the arrangement direction (X direction) of batteries 10, and negative-electrode bus bars 30A, 30B in respective assembled batteries 11B are extended to the other end portion in the arrangement direction (X direction) of batteries 10. With such a configuration, positive-electrode bus bars 20A, 20B and negative-electrode bus bars 30A, 30B which are provided independently for respective assembled batteries 11A, 11B can be connected in parallel using connecting bus bars 60, 70 which are arranged in a direction (Y direction) perpendicular to the arrangement direction (X direction) of the plurality of batteries 10 which form assembled battery 11 on both end portions in the arrangement direction (X direction) of batteries 10. In the exemplary embodiment, positive-electrode bus bars 20A, 20B, negative-electrode bus bars 30A, 30B, and connecting bus bars 60, 70 can be bonded to each other by laser welding, for example.

In the exemplary embodiment, assembled battery 11 is formed by connecting the plurality of batteries 10 as a unit, and battery block 100 is formed by connecting a plurality of assembled batteries 11 in parallel so that all batteries 10 which form battery block 100 are connected in parallel. Accordingly, by arranging a plurality of battery blocks 100 and by connecting battery blocks 100 disposed adjacently to each other in series, it is possible to form a battery module having a predetermined voltage and a predetermined capacity.

According to the exemplary embodiment, assembled battery 11 formed by connecting the plurality of batteries 10 in parallel is set as a unit, and battery block 100 is formed by arranging the plurality of assembled batteries 11 parallel to each other. Accordingly, even when an arrangement of assembled batteries 11 which form battery block 100 is changed, by merely changing lengths of connecting bus bars 60, 70, assembled batteries 11 can be connected in parallel. With such a configuration, a manufacturing cost can be reduced also with respect to battery blocks 100 having various specifications.

According to the exemplary embodiment, the parallel connection of the plurality of batteries 10 which form assembled battery 11 is performed by positive-electrode bus bars 20A, 20B and negative-electrode bus bars 30A, 30B disposed on one end portions of batteries 10, and the parallel connection of assembled batteries 11 is performed by connecting bus bars 60, 70 which are disposed in a direction perpendicular to the arrangement direction of the plurality of batteries 10 which form assembled battery 11. Accordingly, the parallel connection of all batteries 10 which form battery block 100 can be performed using the minimum number of members. With such a configuration, a material cost of battery block 100 can be reduced.

Further, according to the exemplary embodiment, positive-electrode bus bars 20A, 20B and negative-electrode bus bars 30A, 30B are provided independently for respective assembled batteries 11. Accordingly, corresponding to the number of batteries 10 which form assembled battery 11, it is possible to design positive-electrode bus bars 20A, 20B and negative-electrode bus bars 30A, 30B suitable for the current capacity of batteries 10. With such a configuration, a material cost of positive-electrode bus bars 20A, 20B and negative-electrode bus bars 30A, 30B can be reduced.

Figure 9:
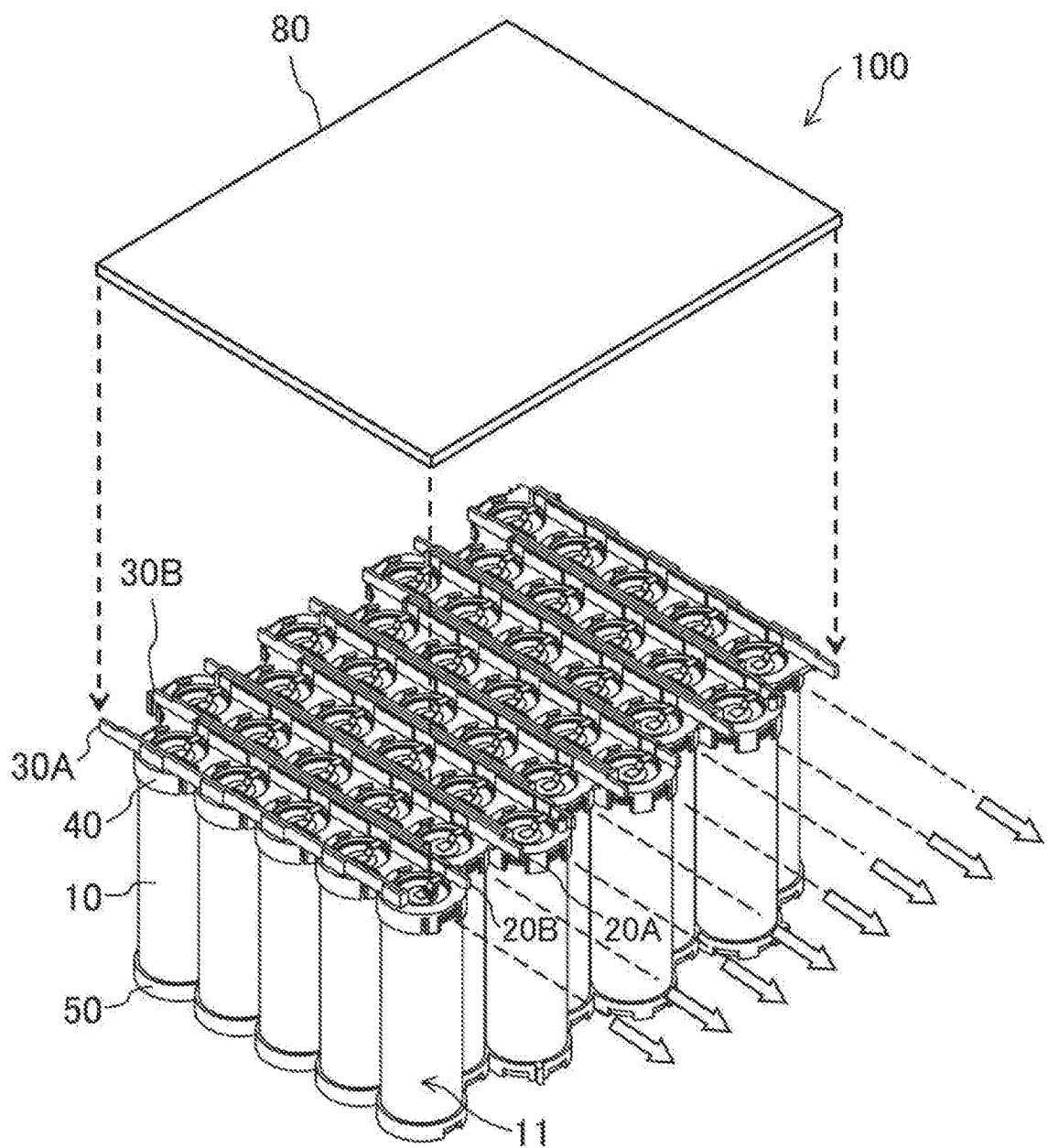
FIG. 9 is a perspective view schematically showing the configuration of a battery block according to another exemplary embodiment of the present invention.

FIG. 9 is a perspective view schematically showing the configuration of battery block 100 according to another exemplary embodiment of the present invention.

Battery block 100 according to the exemplary embodiment has the configuration where one ends of batteries 10 are covered by lid body 80 from above in battery block 100 shown in FIG. 1. In such a configuration, positive-electrode bus bars 20A, 20B and negative-electrode bus bars 30A, 30B provided to respective assembled batteries 11 are positioned above one end portions of batteries 10. Accordingly, a predetermined space is defined by lid body 80 and side walls of positive-electrode bus bars 20A, 20B and negative-electrode bus bars 30A, 30B.

On the other hand, in battery 10 according to this exemplary embodiment, as shown in FIG. 3, open portion 5a for discharging a gas generated in battery 10 to the outside is formed in sealing plate 5. Accordingly, the space defined by lid body 80 and the side walls of positive-electrode bus bars 20A, 20B and negative-electrode bus bars 30A, 30B can be used as an exhaust duct for discharging a gas ejected from batteries 10 to the outside. With such a configuration, as shown in FIG. 9, even when a gas is generated in battery 10 due to the generation of heat caused by an internal short circuit or the like and a high-temperature gas is ejected from battery 10, the high-temperature gas can be discharged to the outside of battery block 100 toward a direction indicated by arrows through the exhaust duct.

Figure 10A:
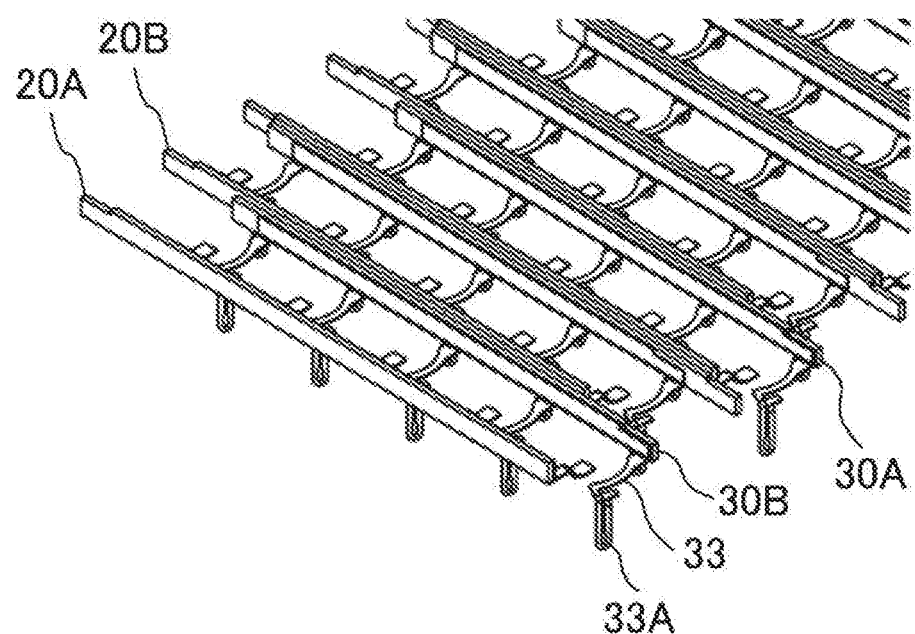
FIG. 10A is a view schematically showing the configuration of negative-electrode bus bars according to another exemplary embodiment of the present invention, and FIG. is a view showing a state where negative-electrode connecting pieces of the negative-electrode bus bar are connected to negative-electrode terminals of batteries.
Figure 10B:
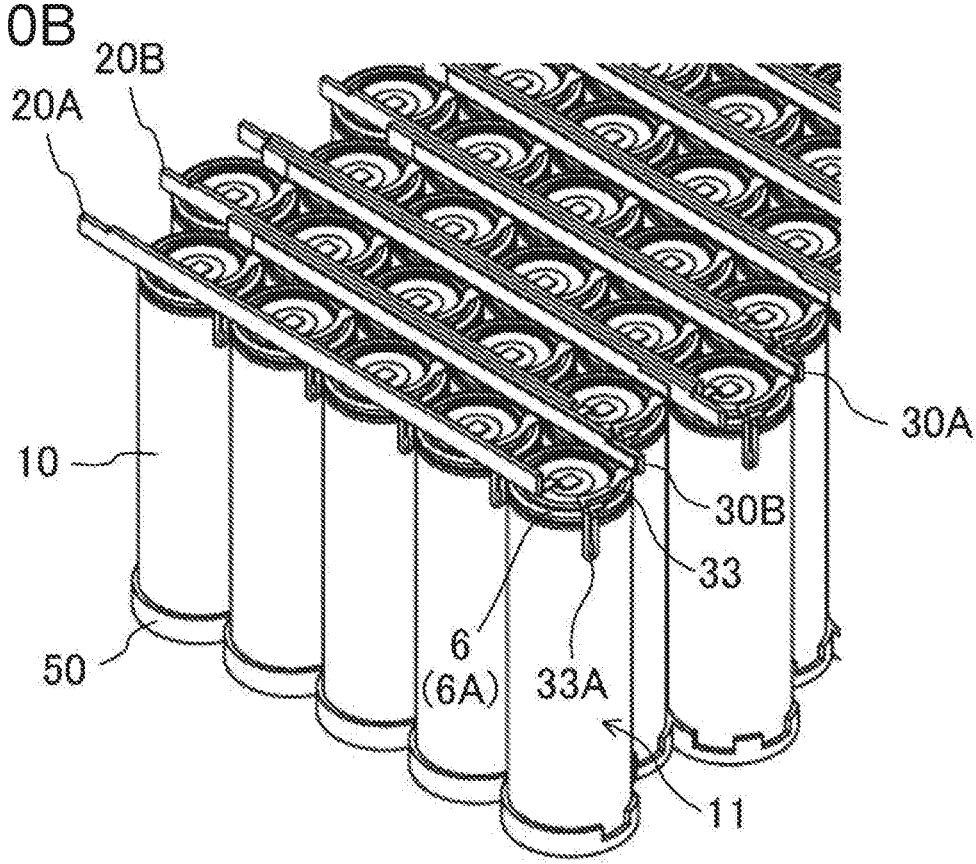

FIG. 10A is a view schematically showing the configuration of negative-electrode bus bar 30B according to another exemplary embodiment of the present invention. FIG. 10B is a view showing a state where negative-electrode connecting pieces 33 of negative-electrode bus bar 30B are connected to negative-electrode terminals 6 (6A) of batteries 10. In this specification, illustration of insulation holder 4 is omitted.

Each of negative-electrode connecting pieces 33 of negative-electrode bus bar 30B according to this exemplary embodiment has fuse portion 33A having a narrow width at a portion of the negative-electrode connecting pieces 33. Fuse portion 33A is formed in a vertically folded shape along a side surface of battery 10 so as not to be brought into contact with battery case 6. With such a configuration, it is possible to ensure a length for providing fuse portion 33A to negative-electrode connecting piece 33. Accordingly, in a case where an abnormality occurs in battery 10, fuse portion 33A connected to battery 10 is fused by an overcurrent and hence, battery 10 where an abnormality occurs can be electrically isolated from other batteries 10.

A shape of fuse portion 33A according to this exemplary embodiment is not particularly limited provided that fuse portion 33A is a portion which is formed to have a larger electrical resistance than other portions of negative-electrode connecting piece 33.

Although the present invention has been described heretofore with reference to preferred embodiments, the above-mentioned descriptions are not limiting items, and it is needless to say that various modifications are conceivable. For example, in the above-mentioned embodiments, in assembled batteries 11 disposed adjacently to each other, the plurality of batteries 10 which form assembled batteries 11 are arranged in a staggered manner. However, respective batteries 10 may be arranged in a row in a direction (Y direction) perpendicular to an arrangement direction (X direction) of batteries 10.

In the above-mentioned embodiments, two kinds of positive-electrode bus bars 20A, 20B which differ from each other in length and two kinds of negative-electrode bus bars 30A, 30B which differ in length are used. However, positive-electrode bus bars of one kind having the same length and negative-electrode bus bars of one kind having the same length may be used.

Further, in the above-mentioned embodiments, as batteries 10 which form assembled battery 11, the circular-cylindrical lithium ion secondary battery is exemplified. However, battery 10 is not limited to the circular-cylindrical lithium ion secondary battery, and a kind, a shape and the like of battery 10 are not limited provided that battery 10 has a positive-electrode terminal and a negative-electrode terminal which are electrically insulated from each other on one end portion of the battery 10.

The invention claimed is:

1. A battery block comprising a plurality of assembled batteries that are arranged in parallel to each other, the plurality of assembled batteries being each formed of a plurality of batteries as a unit, wherein:
    each of the plurality of batteries has a positive-electrode terminal and a negative-electrode terminal which are electrically insulated from each other on one end portion of the battery,
    each of the plurality of assembled batteries includes:
        the plurality of batteries which are arranged in a row in a state where the one end portion of each of the plurality of batteries is directed in a same direction;
        an insulation holder which is disposed on a side of the one end portion of each of the plurality of batteries and holds the plurality of batteries; and
        a positive-electrode bus bar which is disposed on the one end portion of each of the plurality of batteries and connects the positive-electrode terminals of the plurality of batteries to each other in parallel, and a negative-electrode bus bar which is disposed on the one end portion of each of the plurality of batteries and connects the negative-electrode terminals of the plurality of batteries to each other in parallel, and
    the insulation holder includes holding ribs which are arranged in a staggered manner so that the positive-electrode bus bar and the negative-electrode bus bar are each held by being inserted into a gap formed between the holding ribs, the holding ribs comprising a first row and a second row parallel with the first row.

2. The battery block according to claim 1, wherein
    the positive-electrode bus bar has a plurality of positive-electrode connecting pieces each connected to the positive-electrode terminal of each of the plurality of batteries, and
    the negative-electrode bus bar has a plurality of negative-electrode connecting pieces each connected to the negative-electrode terminal of each of the plurality of the batteries.

3. The battery block according to claim 1, wherein
    each of the plurality of batteries includes a battery case made of metal, and a sealing plate which seals an open portion of the battery case and is electrically insulated from the battery case,
    the positive-electrode terminal is formed of the sealing plate, and
    the negative-electrode terminal is formed of the battery case.

4. The battery block according to claim 1, wherein the positive-electrode bus bar and the negative-electrode bus bar which are provided independently for each of the plurality of assembled batteries are respectively connected in parallel by connecting bus bars which are disposed in a direction perpendicular to an arrangement direction of the plurality of batteries which form each of the plurality of assembled batteries.

5. The battery block according to claim 1, wherein the insulation holder which is disposed on each of the plurality of assembled batteries is integrally formed with respect to the plurality of assembled batteries.

6. The battery block according to claim 1, wherein
    the battery block includes a lid body which covers one ends of the plurality of batteries from above, and
    an exhaust duct for discharging a gas ejected from the plurality of batteries to an outside is defined by the lid body and side walls of the positive-electrode bus bar and the negative-electrode bus bar.

7. The battery block according to claim 1, wherein in the plurality of assembled batteries disposed adjacently to each other, the plurality of batteries which form each assembled battery are arranged in a staggered manner.

8. The battery block according to claim 2, wherein each of the plurality of negative-electrode connecting pieces has a fuse portion.

9. The battery module according to claim 1, wherein each of the positive-electrode bus bar and the negative-electrode bus bar has a bar shape having a width smaller than a height.

10. A battery module comprising a plurality of the battery blocks according to claim 1 being arranged, wherein the plurality of battery blocks arranged adjacently to each other are connected to each other in series.

11. A battery block comprising a plurality of assembled batteries that are arranged in parallel to each other, the plurality of assembled batteries being each formed of a plurality of batteries as a unit, wherein:
    each of the plurality of batteries has a positive-electrode terminal and a negative-electrode terminal which are electrically insulated from each other on one end portion of the battery,
    each of the plurality of assembled batteries includes:
        the plurality of batteries which are arranged in a row in a state where the one end portion of each of the plurality of batteries is directed in a same direction;
        an insulation holder which is disposed on a side of the one end portion of each of the plurality of batteries and holds the plurality of batteries; and
        a positive-electrode bus bar which is disposed on the one end portion of each of the plurality of batteries and connects the positive-electrode terminals of the plurality of batteries to each other in parallel, and a negative-electrode bus bar which is disposed on the one end portion of each of the plurality of batteries and connects the negative-electrode terminals of the plurality of batteries to each other in parallel,
    the positive-electrode bus bar and the negative-electrode bus bar are respectively held by holding portions which are formed on the insulation holder in parallel to each other along a row direction,
    at least one of the positive-electrode bus bar and the negative-electrode includes a current collector plate, and a plurality of connecting pieces extending from the current collector plate,
    at least a portion of the current collector plate located in one of the holding portions extends in a direction perpendicular to a top surface of the insulation holder, where a thickness direction of the current collector plate crosses the direction perpendicular to the top surface of the insulation holder, and
    the at least portion of the current collector plate is held by at least the holding portions.

* * * * *